United States Patent [19]

DeLaRonde

[11] Patent Number: 5,425,223

[45] Date of Patent: Jun. 20, 1995

[54] GRASS MOWER BLOCKAGE MONITOR

[76] Inventor: Troy J. P. DeLaRonde, 406 Victoria Avenue East, Thunder Bay, Ontario, Canada, P7C 1A5

[21] Appl. No.: 247,717

[22] Filed: May 23, 1994

[51] Int. Cl.⁶ .................... A01D 34/64; A01D 34/70
[52] U.S. Cl. .................... 56/10.2 R; 56/13.3; 56/153
[58] Field of Search .................... 56/10.2 R, DIG. 15, 56/DIG. 8, 13.3, 13.4, 16.6, 14.5, 153, 202

[56] References Cited

U.S. PATENT DOCUMENTS 3,863,428  2/1975  Baxter ............................ 56/10.2 R
4,286,424  9/1981  Hubbard ......................... 56/10.2 R
5,063,729  11/1991 Fox et al. .................... 56/10.2 R X
5,321,939  6/1994  Fuse et al. ........................ 56/10.2

Primary Examiner—Stephen J. Novosad
Attorney, Agent, or Firm—Adrian D. Battison; Murray E. Thrift; Stanley G. Ade

[57] ABSTRACT

This invention provides an indicator means for a grass mower to detect blockages of a duct used to transport clippings from a mower head to a storage container. The indicator is mounted on the duct and is responsive to air flow rate in the duct thereby indicating any reduction of air flow rate from a predetermined normal flow rate and therefore when a blockage is occurring so that the operator can take actions to prevent it.

8 Claims, 4 Drawing Sheets

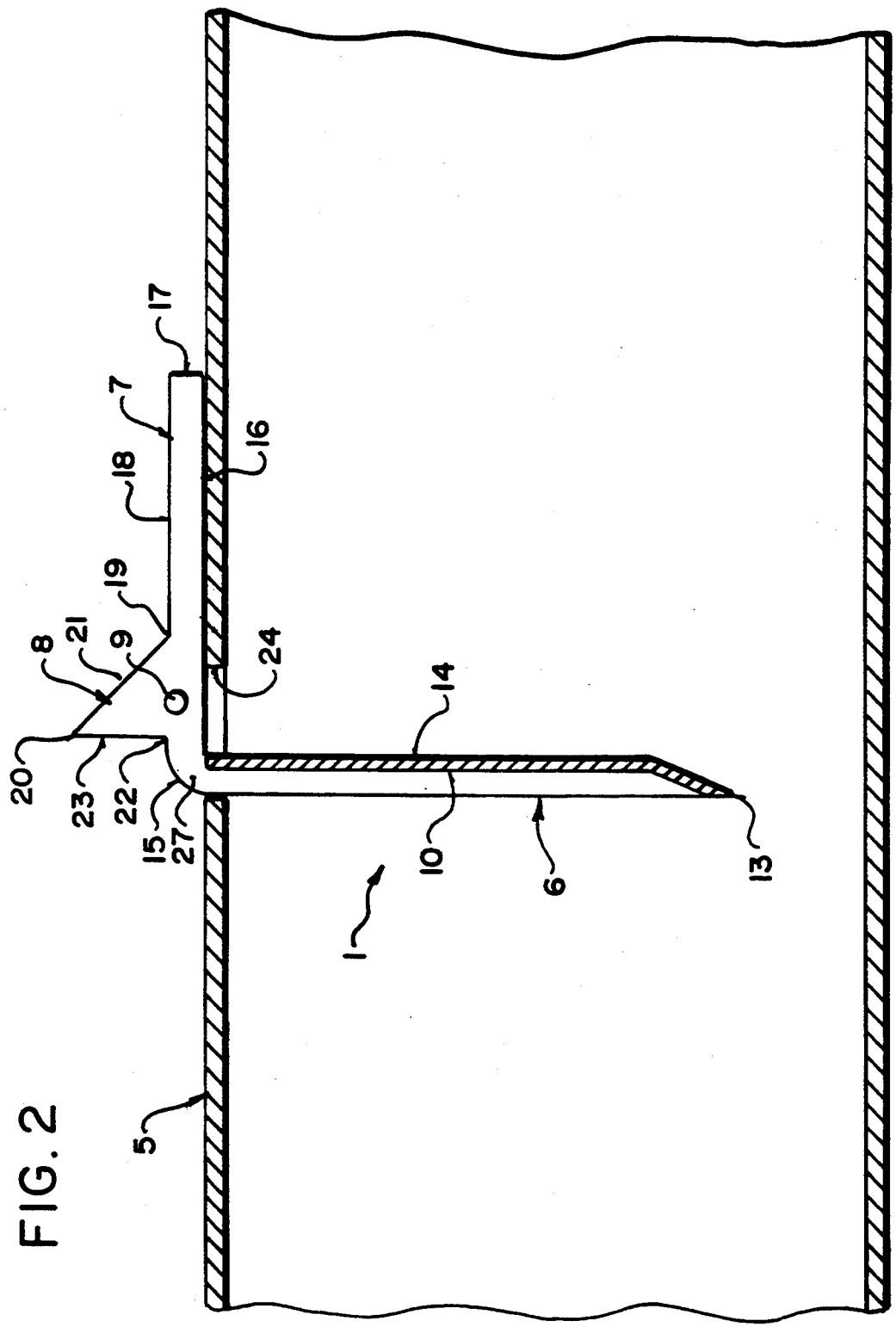

GRASS MOWER BLOCKAGE MONITOR

BACKGROUND OF THE INVENTION

The present invention relates to a grass mower having a monitor system for detecting blockage of a duct transporting clippings from a mower head to a storage container.

Many grass mowing systems include a mower head which is mounted on a suitable transportation vehicle by which the mower head is moved across the ground in a cutting action. It is often desirable to collect the mower clippings in a container since this removes the clippings from the ground and provides a more attractive effect when the mowing is complete. The grass clippings are transported from the mower head into the container by air flow generated by the rotation of the mower blade.

Particularly in larger mowers such as yard tractors, the mower head is mounted under the belly of the tractor while the container is mounted on the rear of the tractor so that it is necessary for ducts to be provided between the mower head and the container for transportation of the clippings therealong under the airflow from the mower blade. Such an arrangement operates very effectively except in circumstances where the amount of grass being generated by the cutting action exceeds the ability of the airflow and the duct to transport that quantity of clippings from the mower head to the container. This particularly occurs when the clippings are damp or carry a heavier amount of moisture since this moisture increases the possibility of blockages occurring.

At the present time, there is no simple device provided on the tractor to detect when the blockage is occurring. The only indication to the operator is therefore when the blockage has occurred and the clippings are deposited on the ground due to the inability to transport those clippings to the container. Once the blockage has occurred, it is of course difficult to clear that blockage and it is necessary to halt operation of the tractor and the mower head to prevent any possibility of contacting the mower blade.

SUMMARY OF THE INVENTION

It is one object of the present invention, therefore to provide a simple device which can indicate when a blockage is commencing so that the operator of the mower can temporarily reduce the mowing rate, by reducing the forward speed of the vehicle so that the blockage clears without reaching a stage in which the blockage is complete thus requiring a full clean out.

According to one aspect of the invention there is provided a grass mower comprising a mower head having a rotating mower blade for cutting grass to form clippings and for generating an air flow for moving the clippings, transport means carrying the mower head for movement across the ground in a mowing action, the mower head having an outlet opening for discharge of the mowed clippings in the air flow generated by the mower blade, a container for receiving and storing the mower clippings and a duct connected to the discharge opening at one end of the duct and to the container at an opposed end of the duct through which the clippings are transported by the air flowing through the duct, and indicator means mounted on the duct and responsive to air flow rate in the duct for indicating reduction of air flow rate from a predetermined normal flow rate.

Preferably the indicator comprises a flap member pivotally mounted in the duct with a flag member carded on the flap member which is exposed on the outside surface of the duct when the air flow is at its normal flow rate.

Preferably the flag member and the flap member are shaped so that in the normal flow rate position the flap member and the flag member provide almost no obstacle to air flow within the interior of the duct.

The grass mower wherein the flap member has a cross sectional shape matching a cross sectional shape of an adjacent wall portion of the duct such that the flap member lies flat against the wall portion in the second position thereof.

The grass mower wherein the duct is of substantially circular cylindrical shape and wherein the flap member has a cross sectional shape which is part circular so as to lie flat against the inside surface of the duct in the second position.

One embodiment of the invention will now be described in conjunction with the accompanying drawings in which:

BRIEF DESCRIPTION OF THE DRAWINGS

FIG. 2 is a vertical cross sectional view of the duct of showing the indicator in a position no air flow rate.

In the drawings like characters of reference indicate corresponding parts in the different Figures.

DETAILED DESCRIPTION

Figure 1:
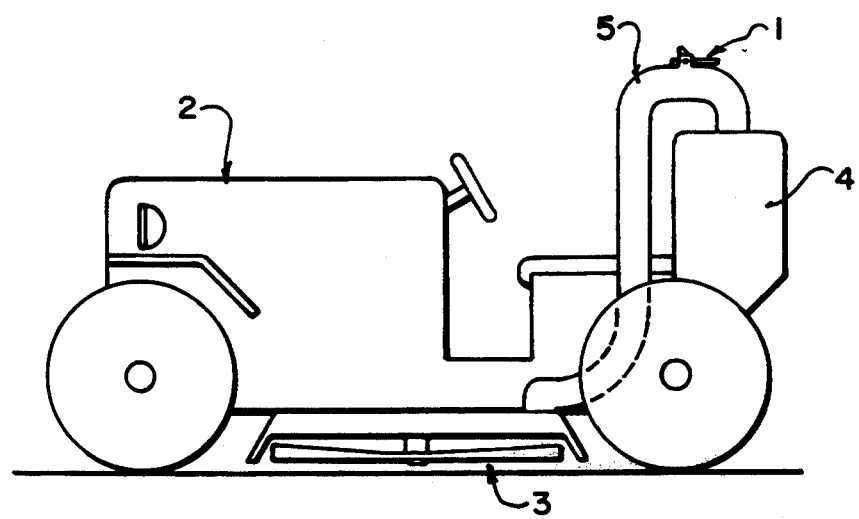
FIG. 1 is a schematic side elevation view of a mower according to the present invention.

Referring to FIG. 1 the indicator 1 is mounted on a grass mower 2 comprising, a rotating mower head 3, a container 4 for receiving and storing the mower clippings, and a duct 5 through which the clippings are transported to the container 4.

Figure 4:
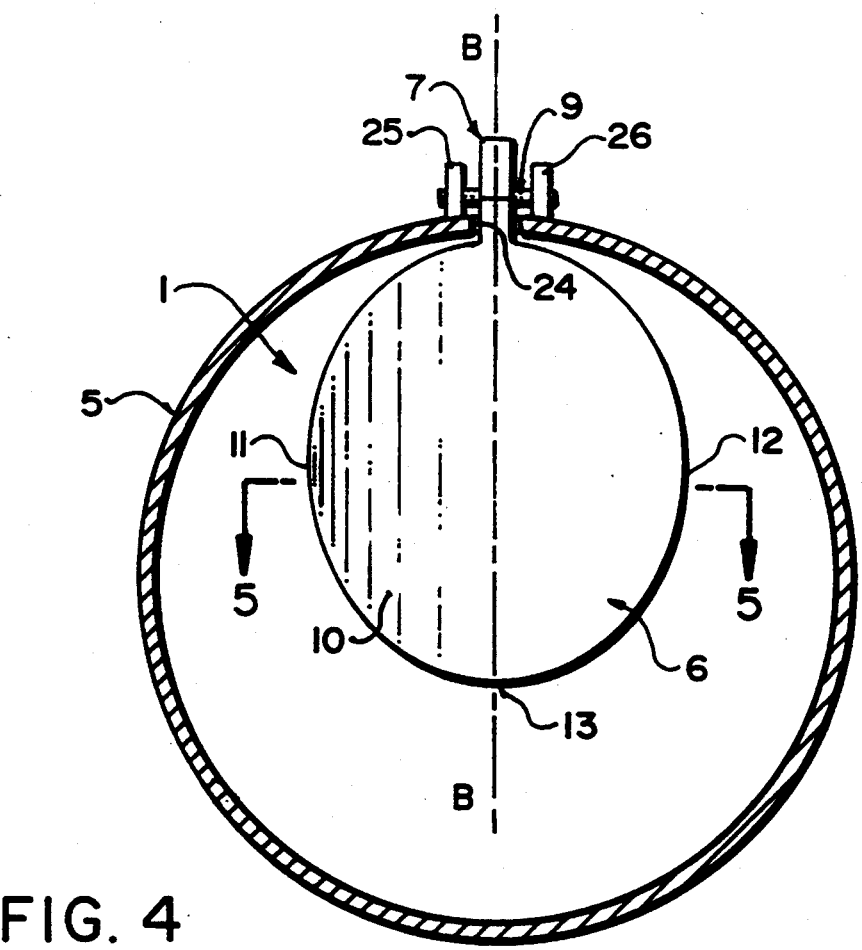
FIG. 4 is a cross sectional view of the duct looking in the direction of air flow.

In FIGS. 2 and 4 the indicator 1 is shown in the first position under conditions of no air flow. The indicator 1 is a single molded piece which is composed of a number of features; a flap member 6, a flag member 7, an triangular sealing flange 8, a pin 9.

Figure 5:
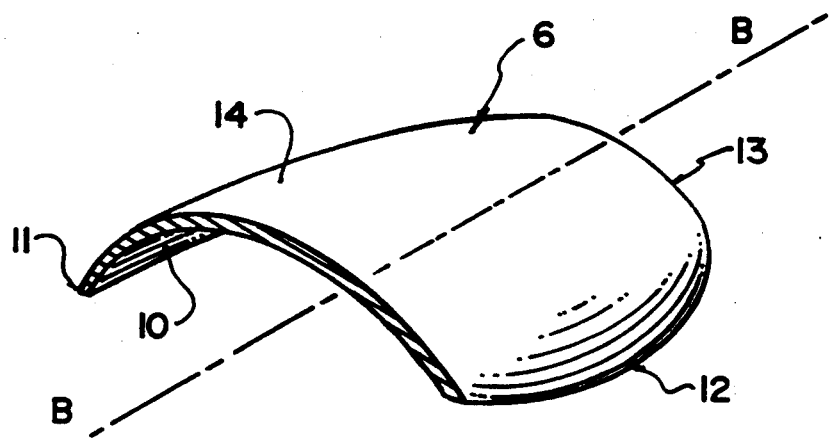
FIG. 5 is a cross sectional view along the lines A—A of FIG. 4.

Referring to FIGS. 2 and 4 the flap member 6 is inside the duct 5 and is biased in the first position such that when in the first position it is generally perpendicular to an interior wall of the duct 5. The flap member 6 has a front surface 10 that when viewed from the front is generally circular and is shaped so that it is curved inward towards a centre line B—B from each side 11, 12 and inwards and upwards from a bottom end 13 forming thereby a generally concave surface. A back surface 14 of the flap member follows the shape of the front surface 10 terminating at the top at a point 15 where it intersects with the flag member 7 forming thereby a generally convex surface when viewed from behind. The flap member in cross section is part circular such that it lies flat against the interior surface of the duct 5 when in the second position (see FIGS. 3 and 5).

Referring to FIG. 2 the flag member 7 of the indicator 1 is located on the outside of the duct 5 and is generally rectangular in cross section and on each side. When in the first position the flag member 7 is generally parallel to the outer surface of the duct 5 such that it has; a bottom surface 16 which begins at the point 15 at the top of the back of the flap member 6 and extends perpendicular to the flap member 6 parallel to the outer surface of the duct 5 along the longitudinal axis of the duct, an end surface 17 pointing upwards perpendicular to the bottom surface 16, and a top surface 18 which runs from the end surface 17 to an intersection point 19 where it joins with the triangular sealing flange 8.

From the intersection point 19 a triangular sealing flange 8 projects upwards on a angle to an apex 20 forming thereby an inclined surface 21, and then downwards in line with the back surface 14 of the flap member 6 to a point 22 in line with the top surface of the flag member 7 forming a sealing surface 23. A radius 27 extends from point 22 on the sealing surface 23 of the triangular sealing flange to the front surface 10 of the flap member 6 joining the front surface to the triangular sealing flange 8. The sealing flange has a cross section with the same width as that of the flag member (see FIG. 6).

A pin 9 or similar member projects through and is perpendicular to the triangular sealing flange 8 such that it forms a pivot around which the whole of the indicator 1 may rotate.

Figure 6:
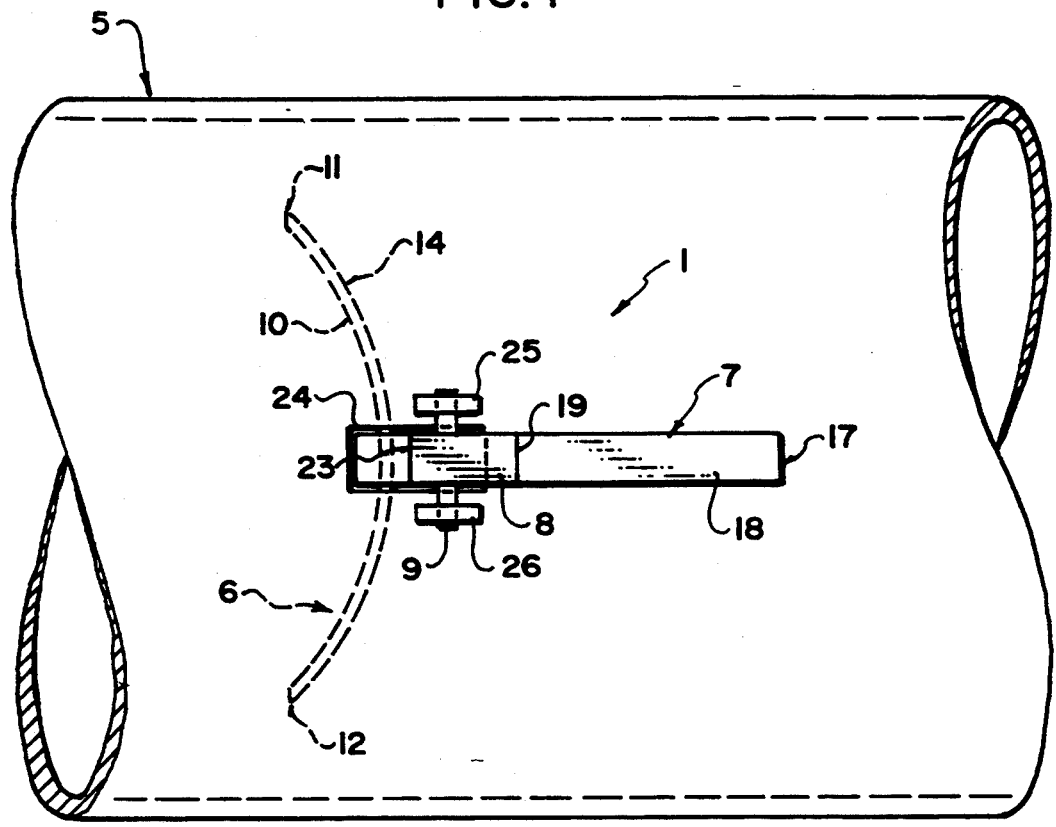
FIG. 6 is a top view of the duct and indicator.

Referring to FIGS. 4 and 6 on the duct 5 at the location where the indicator 1 is mounted is a rectangular slot shaped opening 24 and on each side of the slot shaped opening is a support member 25,26. The indicator 1 is mounted so that it passes through the rectangular slot shaped opening 24 such that the flag member 7 is on the outside of the duct 5 and the flap member 6 is on the inside of the duct 5. A support member 25, 26 on each side of the slot shaped opening 24 accepts the pin 9 to which the indicator 1 is fixed such that it allows rotation of the indicator 1 about the longitudinal axis of the pin.

Figure 3:
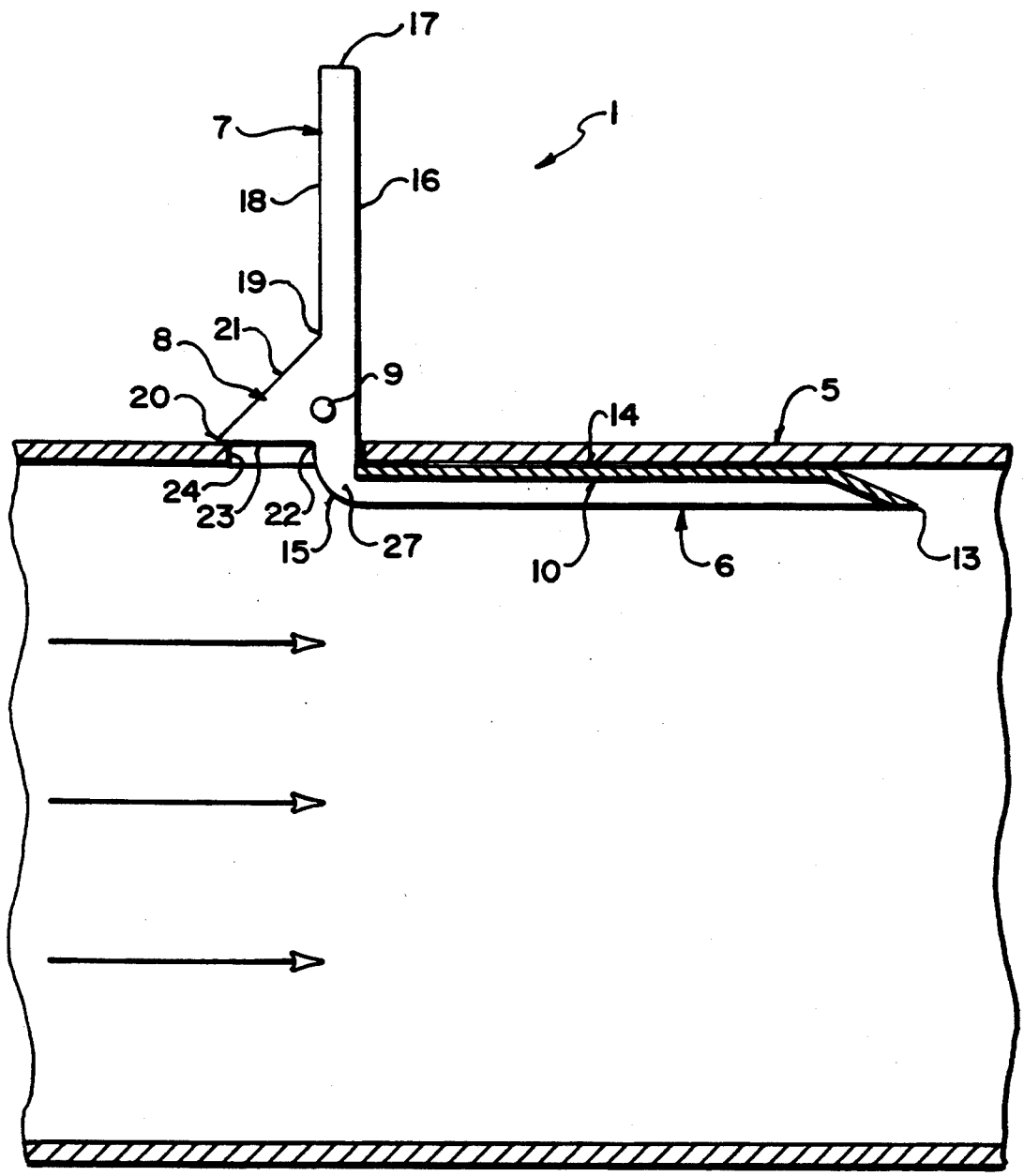
FIG. 3 is a vertical cross sectional view of the duct showing the indicator in a position indicating normal air flow rate.

The indicator 1 will be in position 1 when there is no air flow through the duct. This occurs due to the fact that the weight of the flap member 6 exceeds the weight of the flag member 7 causing the flap member to fall into a vertical position. When in use air flows through the duct 5 caused by pressure generated by the mower head 3 carrying grass clippings through the duct 5 to the container 4. Referring to FIG. 3 the pressure of the air flowing against the flap member 6 in the duct 5 causes the indicator 1 to rotate about the longitudinal axis of the pin 9 so that the flap member 6 rotates into a generally parallel position with respect to the inner surface of the duct (Position 2), the flag member 7 is raised into a generally perpendicular position with respect to the outer surface of the duct, and sealing surface 13 of the triangular sealing flange 8 rotates into contact with the outer surface of the duct thereby closing off any opening that was left unsealed when the flap member rotated into the second position.

The flag member when in a position 2 indicates that there is normal air flow, while the flag member in when in position 1 indicates that there is no air flow and that a complete blockage may have occurred. When in a position intermediate of position 1 and 2 the flag member indicates that normal air flow is being impeded and that a blockage may be occurring thereby allowing the driver to take appropriate actions.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A grass mower comprising a mower head having a rotating mower blade for curing grass to form clippings and for generating an air flow for moving the clippings, transport means carrying the mower head for movement across the ground in a mowing action, the mower head having an outlet opening for discharge of the mowed clippings in the air flow generated by the mower blade, a container for receiving and storing the mower clippings and a duct connected to the discharge opening at one end of the duct and to the container at an opposed end of the duct through which the clippings are transported by the air flow flowing through the duct, and indicator 1 means mounted on the duct and responsive to air flow rate in the duct for indicating reduction of air flow rate from a predetermined normal flow rate.

2. The grass mower according to claim 1 wherein the indicator 1 means comprises a flap member mounted within the duct and movable relative thereto in response to airflow moving there through, the flap member having a first position into which it is biased and being movable from the first position in response to air flow at said normal flow rate to a second position for indicating said normal flow rate.

3. The grass mower according to claim 2 wherein the flap member is pivotally mounted on the duct.

4. The grass mower according to claim 2 wherein the flap member carries a flag member movable therewith, projecting upwards from the outer surface of the duct when the flap member is in the second position.

5. The grass mower according to claim 4 wherein the flap member and the flag member are arranged such that in a second position the flap member in the flag member provide almost no obstacle to flow through the duct.

6. The grass mower according to claim 5 wherein the flap member has a cross sectional shape matching a cross sectional shape of an adjacent wall portion of the duct such that the flap member lies flat against the wall portion in the second position thereof.

7. The grass mower according to claim 6 wherein the duct is of substantially circular cylindrical shape and wherein the flap member has a cross sectional shape which is part circular so as to lie flat against the inside surface of the duct in the second position.

8. The grass mower according to claim 6 wherein the flag member is mounted on a surface of the flap member adjacent the inside surface of the duct in the second position such that in a second position the flag member projecting upwards from the outer surface of the duct when the flap member is in the second position.

* * * * *